Figure 1:
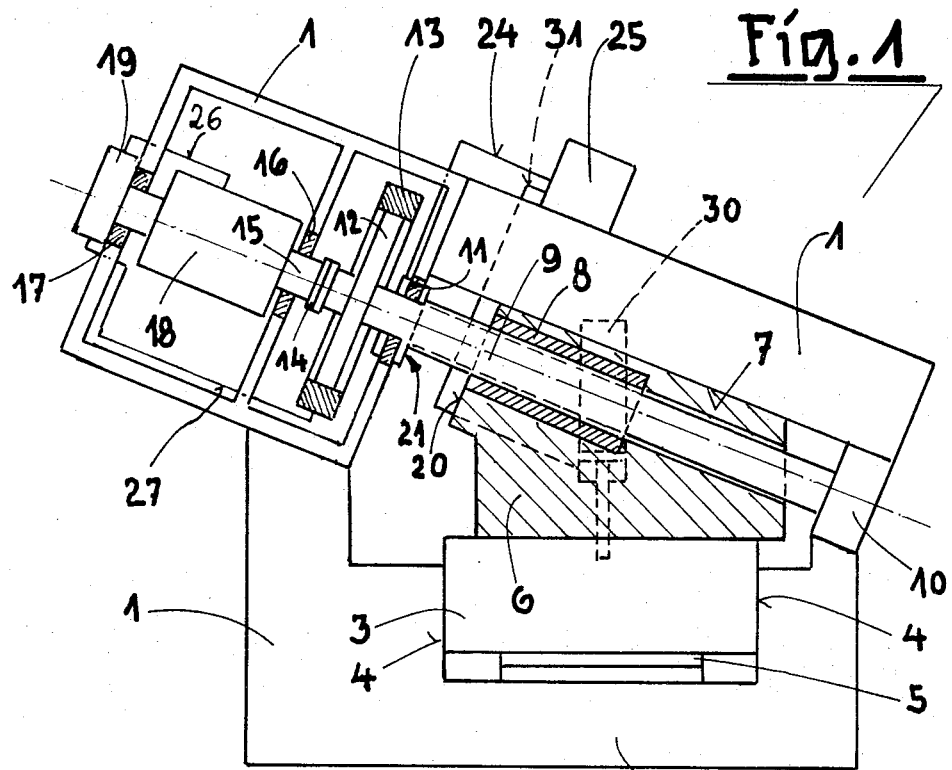

United States Patent [19]
Bachmann et al.

[11] 3,871,225
[45] Mar. 18, 1975

[54] SCREW FORGING PRESS

[75] Inventors: Horst Bachmann, Rodental Ortsteil Einberg; Hans Joachim Kossler, Kaarst, both of Germany

[73] Assignee: Langenstein & Schemann Aktiengesellschaft, Coburg, Germany

[22] Filed: May 28, 1974

[21] Appl. No.: 474,102

[30] Foreign Application Priority Data
June 1, 1973 Germany............................ 2327843

[52] U.S. Cl..................... 72/452, 72/454, 100/289, 100/291
[51] Int. Cl............................................... B21j 9/18
[58] Field of Search ...... 72/452, 454; 100/289, 270, 100/290, 291

[56] References Cited
UNITED STATES PATENTS
3,122,033   2/1964   Riemenschneider................ 100/291
3,139,816   7/1964   Jemison............................ 100/291
3,595,163   7/1971   Baumann........................... 100/270
3,786,743   1/1974   Discher............................. 100/270

FOREIGN PATENTS OR APPLICATIONS
7,550   1838   United Kingdom............. 100/291

*Primary Examiner*— Lanham
*Assistant Examiner*—Gene P. Crosby
*Attorney, Agent, or Firm*—Holman & Stern

[57]                ABSTRACT

A screw forging press is disclosed having the screw rotatably driven by a motor, and a wedge member driven by the screw to actuate the ram of the press. A resilient cushioning plunger and cylinder arrangement is provided for restraining movement of the wedge at the end of the return stroke, and for assisting movement of the wedge at the beginning of its forward stroke.

3 Claims, 2 Drawing Figures

SCREW FORGING PRESS

The present invention relates to a screw forging press.

Some known screw forging presses are of the type comprising a press frame and a reversible pole-changeable asynchronous motor to provide direct drive for a screw firmly connected to a flywheel, a screw nut being movable along the screw, a brake and pole changeability for the asynchronous motor being provided for return of a ram at reduced screw speed.

In a known press of this type, the screw is not axially displaced in order to drive the ram, the screw is mounted vertically and the screw nut is attached to the ram. In order to accelerate the ram for an impact stroke the asynchronous motor is initially driven at reduced speed and then at a higher speed. The stepped increase in the speed of the screw during the impact stroke of the ram or the corresponding reduction in the number of effective pairs of poles of the asynchronous motor does increase the efficiency of the asynchronous motor, but requires an asynchronous motor with a large number of pairs of poles, i.e., an asynchronous motor of considerable geometrical dimensions, and cause a sudden load on the mains supplying the asynchronous motor whenever poles are changed.

It is therefore an object of the present invention to provide an improved press of the type referred to in which the number of sudden loads on the electric mains in operation is reduced and the number of pairs of poles required for the asynchronous motor is fewer.

The present invention provides a screw forging press comprising a press frame and a reversible pole-changeable asynchronous motor to provide direct drive for a screw firmly connected to a flywheel, a screw nut being movable along the screw, a brake and pole changeability for the asynchronous motor being provided for return of a ram at reduced screw speed, wherein a reverse thrust device, attached to the press frame and having a resilient cushion, acts on the wedge - screw drive.

As the wedge-screw drive allows a marked increase in the speed of the screw, the asynchronous motor can be provided with a greatly reduced number of pairs of poles, i.e., it can have greatly reduced geometrical dimensions. The reverse thrust device obviates the need to change the asynchronous motor over to other pairs of poles during the shaping stroke, so the number of sudden strains is reduced. The reverse thrust device and the pole-changeability for the ram return mean that there are no sudden loads, i.e., high current peaks, during either the return stroke or the shaping stroke, although the number of apirs of poles is reduced because of the increased screw speed.

In a screw forging press in accordance with the present invention high current peaks are avoided during the run-up to the shaping stroke, despite the small number of pairs of poles, because of the participation of the reverse thrust device. The asynchronous motor therefore has less power loss in the periods of acceleration, and therefore works more efficiently. The asynchronous motor is made cheaper as less heat is generated in the motor. The geometrical dimensions of the asynchronous motor are considerably reduced. The degree of efficiency is increased, as there are smaller heat losses in the motor and the kinetic energy is not converted into heat during the return stroke, but stored in the reverse thrust device. The inherent moment of inertia of the motor is reduced, which is significant because the design conditions of flywheel and screw and the technical data of the press, such as the forward speed of the ram or the speed of the motor, require a specific total moment of inertia which must match the assumed energy value. Experience has shown that it is very difficult to incorporate a motor with such a large inherent moment of inertia. The press in accordance with the present invention is mainly suitable for shaping work with a relatively high energyy requirement, i.e., is less suitable for grooving and stamping.

A plunger-cylinder device forming the resilient cushion may be connected to a gas container to which a weight-equalizing piston-cylinder device is also attached, the ram, acted upon by the wedge, being suspended against a press frame by means of the said device. The weight-equalizing piston-cylinder device applies a force which is just sufficient to support the ram, i.e., to balance the weight of the ram and the wedge bearing thereupon.

In the gas container, to which the resilient cushion and the weight-equalizing piston-cylinder devices are attached, the opposition of the motions of the plunger-cylinder devices of the cushion and of the weight-equalizing piston-cylinder devices leads to a minimal variation in pressure, for example, the plunger-cylinder device of the cushion collects gas from the container as it starts to move forward, but this gas is re-fed to the container from the weight-equalizing cylinders. The weight-equalizing cylinders equalize play in the guides between ram and wedge or wedge and press frame.

If two parallel screws are provided for the article, only one cushion is necessary, and this is housed between the two screws. However, if only one screw is provided, one cushion-plunger-cylinder device is provided on each of two opposite sides of the screw if a certain symmetry is desired.

In a screw forging press in accordance with the present invention the wedge is driven back by the motor, with the screw rotating. Shortly before the wedge reaches the end of the return stroke the stop surface touches the plunger and the cushion brakes the return motion of the wedge and the rotation of the screw and the parts connected thereto. The energy thus liberated is not converted into heat, but used to compress the cushion. The wedge is held in the terminal position of the return stroke until a fresh forward stroke begins. When the forward stroke begins the asynchronous motor drives the wedge via the screw and is supported by the cushion which displaces the wedge over a short distance. The cushion both acts as a brake and provides thrust. It stores the energy liberated when braking the forging press in the terminal position of the return stroke and releases it again when the forward stroke begins. The braking device does not need to absorb the braking energy.

The motor is switched off not later than the moment at which the wedge reaches the reverse thrust device. However, the motor can also be switched off shortly before contact is made, by means of limit switches. To restart, the brake is released and the motor switched on. It is advisable to release just the shoe brake at first and not switch the motor on until shortly afterwards. The advantage of this is that the shaft of the motor is already rotating when the motor is switched on, as a result of which the current peaks are reduced even further. If the following embodiment is selected, favourable conditions will result in respect of degree of efficiency or heating of the motor; an asynchronous motor with an adjustable number of pairs of poles is used. When the forward storke begins the reverse thrust system starts by driving the screw via the wedge. As soon as the screw has reached the speed which roughly corresponds to the synchronous speed of the motor with the large number of pairs of poles, the motor with the small number of pairs of poles (higher speed step) is switched on.

Figure 2:
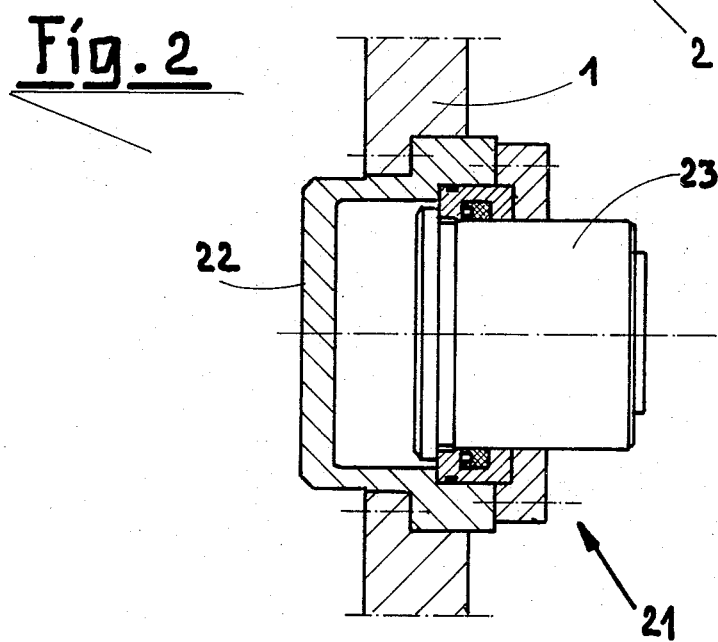

A screw forging press embodying the invention is described below with reference to the accompanying drawings, in which:

FIG. 1 is a diagrammatic side view partly in section of the screw forging press; and FIG. 2 is a section on an enlarged scale through a plunger-cylinder device of the screw forging press.

The screw forging press shown in the drawings comprises a press frame 1, an anvil 2 and a ram 3 movable up and down above the anvil. The ram is guided in lateral guides 4 of the press frame 1. A tool 5 is located between the anvil 2 and the ram 3 for shaping a workpiece (not shown). The ram 3 has a horizontal upper surface on which a wedge 6 rests displaceably in horizontal alignment. The wedge 6 has on its upper side an inclined surface 7 which forms an angle together with a vertical line and lies adjacent a corresponding surface of the press frame 1. The ram 3 is guided against the wedge 6 so that ram and wedge are only independently movable to the extent of any play against each other in vertical alignment. When the inclined surface 7 of the wedge 6 slides along the corresponding surface of the press frame the wedge moves both vertically and horizontally.

A screw nut 8 is fixedly mounted in the wedge 6. A screw or threaded spindle 9 engages with and extends through the nut 8. The longitudinal axis of the screw 9 is parallel to the inclined surface 7. Rotation of the screw 9 causes the screw nut 8 to move along the screw. The screw 9 is rotatably mounted in the press frame 1 by means of bearings 10 and bearing 11. An end portion of the screw 9 projects through the bearing 11 and supports a flywheel 12 which is surrounded by a brake shoe 13 attached to the press frame 1. The flywheel 12 and the brake shoe 13 form a brake device. The end portion of the screw 9 is firmly coupled via a flange 14 to a shaft 15 which is rotatably mounted in the press frame 1 by means of two bearings 16 and 17. The shaft 15 is part of a polechangeable asynchronous motor 18 and is adapted to be driven continuously in one direction of rotation by the asynchronous motor 18. The motor 18 is attached to the press frame 1. A tachogenerator 19 is mounted on the press frame 1 and is adapted to be rotated by the shaft 15. The tachogenerator controls the press.

The wedge 6 has at its rear end a stop surface 20 at right angles to the longitudinal axis of screw 9. In line with the longitudinal axis of the screw and behind the stop surface 20 are two plunger-cylinder devices 21 mounted on the press frame 1, only one of the devices 21 being shown in FIG. 1. The devices 21 are arranged on opposite sides of the vertical plane through the longitudinal axis of the screw. As shown in FIG. 2, each plunger-cylinder device 21 has a cylinder 22 attached to press frame 1, the cylinder receiving a plunger 23 which projects from the cylinder towards the stop surface 20. The cylinder 22 is connected to a pressurized gas container 25 via a tube 24. The ram 3 has, for example, a stroke of about 280 mm, and the plunger 23 has a stroke of about 60 mm. The pressurized gas container contains air at a pressure of about 25 bar. The tachogenerator 19 is connected to the motor 18 via lines 26 and to the brake shoe 13 via lines 27.

A respective piston-cylinder device 30 engages each of two opposite sides of the ram 3. Only one of the devices 30 is shown in FIG. 1. Each piston-cylinder device 30 comprises a cylinder fixed to the press frame 1 and a piston connected to the ram 3 via a piston rod. The interior of the cylinder beneath the piston communicates with the pressurized gas container 25 via a tube 31. The piston-cylinder device 30 serves to bring the ram 3 to abut precisely against the wedge 6 and to carry the weight of the ram 3 and of the wedge, even drawing these somewhat upwards.

The drawing shows the forging press at the end of a forward or impact stroke. At the end of the forward stroke, the motor 18 is switched on so that it rotates the screw 9, which moves the wedges 6 upwards, so that the ram 3 is raised by the piston-cylinder device 30. The wedge 6, moving upwards along the screw 9, comes into contact with a limit switch (not shown) shortly before the stop surface 20 contacts the plunger 23. When the wedge 6 comes into contact with the limit switch, the limit switch switches off the motor 18 via a line (not shown). The wedge 6, because of its inertia, continues to move back after the motor 18 is switched off and presses the plunger 23 into the cylinder 22. As soon as the speed of the screw 9 reaches zero, the tachogenerator 19 switches the braking device on via the line 27. The braking device, having been switched on, restrains the screw and thus the wedge 6, so that plunger 23 remains in its retracted rear-position. If the asynchronous motor 18 is now started and the braking device is released by means of a common signal, the wedge is as it were hurled forwards, i.e., ram 3 is impinged upon very sharply when the forward stroke begins, which is of particular advantage with a short-stroke ram 3. As soon as a certain screw speed is reached, the tachogenerator 29 switches off the motor 18. The motor 18 is switched to reverse when the screw speed drops to zero.

We claim:

1. A screw forging press comprising: a press frame; a ram movable relative to the press frame; a wedge for acting on the ram to cause the ram to execute a forging stroke; a screw nut associated with the wedge for movement therewith; a screw engaged with the screw nut, rotation of the screw in one sense causing movement of the nut along the screw in one direction to effect a forward stroke of the wedge for causing the ram to execute a forging stroke and rotation of the screw in the opposite sense causing movement of the screw nut along the screw in the opposite direction to effect a return stroke of the wedge; a flywheel to which the screw is firmly connected; a reversible pole-changeable asynchronous motor for rotating the flywheel; a brake for braking the motor; means for controlling the sense of rotation of the motor to thereby control the direction of movement of the wedge; and resilient cushioning means for restraining movement of the wedge during at least part of its return stroke and for assisting movement of the wedge during at least part of its forward stroke.

2. A screw forging press as claimed in claim 1, wherein the resilient cushioning means comprises at least one piston-cylinder device which restrains movement of the wedge during at least part of its return stroke and assists movements of the wedge during at least part of its forward stroke, and the press further comprises: a gas cylinder to which said at least one piston-cylinder device is connected, and at least one further piston cylinder device connected to the gas cylinder and urging the ram to a position from which it begins its forging stroke.

3. A screw forging press as claimed in claim 1, wherein the resilient cushioning means comprises two cushioning devices which restrain movement of the wedge during at least part of its return stroke and assist movement of the wedge during at least part of its forward stroke, which devices are positioned on opposite sides of a vertical plane through the longitudinal axis of the screw.

* * * * *